(12) United States Patent
Pegg et al.

(10) Patent No.: US 9,565,249 B2
(45) Date of Patent: *Feb. 7, 2017

(54) ADAPTIVE CONNECTIVITY IN NETWORK-BASED COLLABORATION BACKGROUND INFORMATION

(71) Applicant: ADOBE SYSTEMS INCORPORATED, San Jose, CA (US)

(72) Inventors: Nigel Pegg, San Francisco, CA (US); Hironmay Basu, Belmont, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/042,856

(22) Filed: Feb. 12, 2016

(65) Prior Publication Data

US 2016/0164968 A1 Jun. 9, 2016

Related U.S. Application Data

(63) Continuation of application No. 12/269,736, filed on Nov. 12, 2008, now Pat. No. 9,294,291.

(51) Int. Cl.
G06F 15/16 (2006.01)
H04L 29/08 (2006.01)
H04L 12/18 (2006.01)
H04L 29/06 (2006.01)

(52) U.S. Cl.
CPC ....... *H04L 67/1091* (2013.01); *H04L 12/1827* (2013.01); *H04L 67/1078* (2013.01); *H04L 67/32* (2013.01); *H04L 67/42* (2013.01)

(58) Field of Classification Search
CPC .......................... H04L 67/1091; H04L 12/1827

USPC .................................................. 709/228, 227
See application file for complete search history.

(56) References Cited

U.S. PATENT DOCUMENTS

| | | | |
|---|---|---|---|
| 5,627,936 A | 5/1997 | Prasad et al. | |
| 5,892,915 A | 4/1999 | Duso et al. | |
| 6,321,252 B1 | 11/2001 | Bhola et al. | |
| 6,342,906 B1 | 1/2002 | Kumar et al. | |
| 6,343,313 B1 | 1/2002 | Salesky et al. | |
| 6,357,042 B2 | 3/2002 | Srinivasan et al. | |
| 6,721,921 B1 | 4/2004 | Altman | |
| 6,898,642 B2 | 5/2005 | Chafle et al. | |

(Continued)

FOREIGN PATENT DOCUMENTS

| | | |
|---|---|---|
| JP | 2004140678 A | 5/2004 |
| JP | 2005341015 A | 12/2005 |
| WO | 2009042416 A1 | 4/2009 |

OTHER PUBLICATIONS

Handley, et al., "Session Initiation Protocol", RFC 2543: IETF, (Mar. 1999), 1-153.

(Continued)

*Primary Examiner* — Joseph E Avellino
*Assistant Examiner* — Marshall McLeod
(74) *Attorney, Agent, or Firm* — Shook, Hardy & Bacon L.L.P.

(57) ABSTRACT

Various embodiments include at least one of systems, methods, software, and data structures for peer-to-peer exchange of at least a portion of networked collaboration session data. Client and server solutions allow for switching between peer-to-peer and server-centric modes of collaboration data sharing. Some embodiments also allow for sharing of data of a first type via a collaboration server and data of a second type via peer-to-peer connections.

20 Claims, 6 Drawing Sheets

(56) References Cited

U.S. PATENT DOCUMENTS

| | | |
|---|---|---|
| 6,915,512 B1 | 7/2005 | Miyajima |
| 7,085,558 B2 | 8/2006 | Berstis et al. |
| 7,099,798 B2 | 8/2006 | Yu et al. |
| 7,107,307 B1 | 9/2006 | Takishita |
| 7,133,831 B2 | 11/2006 | Brown et al. |
| 7,143,136 B1 | 11/2006 | Drenan et al. |
| 7,213,051 B2 | 5/2007 | Zhu et al. |
| 7,248,684 B2 | 7/2007 | Caspi et al. |
| 7,295,752 B1 | 11/2007 | Jain et al. |
| 7,349,944 B2 | 3/2008 | Vernon et al. |
| 7,421,069 B2 | 9/2008 | Vernon et al. |
| 7,437,408 B2 | 10/2008 | Schwartz et al. |
| 7,590,941 B2 | 9/2009 | Wee et al. |
| 7,634,533 B2 | 12/2009 | Rudolph et al. |
| 7,945,622 B1 | 5/2011 | Pegg |
| 7,966,397 B2 | 6/2011 | Dong et al. |
| 2002/0194219 A1 | 12/2002 | Bradley et al. |
| 2003/0195791 A1 | 10/2003 | Waller et al. |
| 2003/0208541 A1 | 11/2003 | Musa |
| 2004/0006548 A1 | 1/2004 | Mahmood |
| 2004/0107256 A1 | 6/2004 | Odenwald et al. |
| 2004/0107270 A1 | 6/2004 | Stephens et al. |
| 2004/0111639 A1 | 6/2004 | Schwartz et al. |
| 2004/0133647 A1 | 7/2004 | Ozkan et al. |
| 2004/0181577 A1 | 9/2004 | Skurikhin et al. |
| 2004/0189700 A1 | 9/2004 | Mandavilli et al. |
| 2004/0205452 A1 | 10/2004 | Fitzsimons et al. |
| 2004/0207724 A1 | 10/2004 | Crouch et al. |
| 2004/0240642 A1 | 12/2004 | Crandell et al. |
| 2004/0267871 A1 | 12/2004 | Pratley et al. |
| 2005/0010607 A1 | 1/2005 | Parker et al. |
| 2005/0055321 A1 | 3/2005 | Fratkina et al. |
| 2005/0066037 A1 | 3/2005 | Song et al. |
| 2005/0071440 A1 | 3/2005 | Jones et al. |
| 2005/0198006 A1 | 9/2005 | Boicey et al. |
| 2005/0210105 A1 | 9/2005 | Hirata et al. |
| 2006/0026251 A1 | 2/2006 | Cheng et al. |
| 2006/0026502 A1 | 2/2006 | Dutta |
| 2006/0143043 A1 | 6/2006 | McCallie et al. |
| 2006/0167662 A1 | 7/2006 | Yu et al. |
| 2006/0171515 A1 | 8/2006 | Hintermeister et al. |
| 2006/0173959 A1 | 8/2006 | McKelvie et al. |
| 2006/0200374 A1 | 9/2006 | Nelken |
| 2006/0200520 A1 | 9/2006 | Vernon et al. |
| 2006/0204213 A1 | 9/2006 | Slone |
| 2006/0279627 A1 | 12/2006 | Yamamoto et al. |
| 2006/0279628 A1 | 12/2006 | Fleming |
| 2007/0050448 A1 | 3/2007 | Gonen et al. |
| 2007/0061296 A1 | 3/2007 | Burke et al. |
| 2007/0078821 A1 | 4/2007 | Kubo et al. |
| 2007/0081522 A1 | 4/2007 | Apelbaum |
| 2007/0118794 A1 | 5/2007 | Hollander |
| 2007/0143149 A1 | 6/2007 | Buttner et al. |
| 2007/0174334 A1 | 7/2007 | Inoue et al. |
| 2007/0186157 A1 | 8/2007 | Walker et al. |
| 2007/0192410 A1 | 8/2007 | Liversidge et al. |
| 2008/0005244 A1 | 1/2008 | Vernon et al. |
| 2008/0077666 A1 | 3/2008 | Sekaran et al. |
| 2008/0130525 A1 | 6/2008 | Jansen et al. |
| 2008/0172607 A1 | 7/2008 | Baer |
| 2008/0189365 A1 | 8/2008 | Narayanaswami et al. |
| 2008/0229037 A1 | 9/2008 | Bunte et al. |
| 2008/0288580 A1 | 11/2008 | Wang et al. |
| 2008/0320081 A1 | 12/2008 | Shriver-Blake et al. |
| 2009/0049129 A1 | 2/2009 | Faisal et al. |
| 2009/0089379 A1 | 4/2009 | Pegg |
| 2009/0099827 A1 | 4/2009 | Georgis et al. |
| 2009/0204906 A1 | 8/2009 | Irving |
| 2014/0029919 A1 | 1/2014 | Codavalli et al. |
| 2014/0032655 A1 | 1/2014 | Pegg |
| 2014/0032771 A1 | 1/2014 | Pegg et al. |
| 2014/0033073 A1 | 1/2014 | Pegg |

OTHER PUBLICATIONS

Lukasz, B, et al., "TANGO—a Collaborative Environment for the World-Wide Web",Northeast Parallel Architectures Center, Syracuse University, [Retrieved from the Internet] URL:http://citeseerx.ist.psu.edu/viewdoc/summary?doi=10.1.1.52.768, (Feb. 1997), 16 pgs.

Morrison, D., et al., "Lotus Sametime Application Development Guide", I [Retrieved from the Internet] URL:http://www.redbooks.ibm.com/redbooks/pdfs/sg245651.pdf, (May 2000), 177 pgs.

Video Conferencing: P2P Solution From VSee Launches New Free Full Collaboration Version, [Online]. Retrieved from the Internet: <URL:http://www.masternewmedia.org/news/2007/03/05/video_conferencing_p2p solution from.htm>,(May 5, 2007),18 pgs.

Chabert, A., et al., "Java Object-Sharing in Habanera", Communications of the Association for Computing Machinery vol. 41 (6), (Jun. 1, 1998), 69-76.

| SESSION | P2P CLIENT | P2P CONFIG | PORTS | UP. RATE | DOWN RATE | CONNECTIVITY DATA |
|---|---|---|---|---|---|---|
| 1 | 10.0 | YES | 70/90 | 80 KBPS | 125 KBPS | 192.100.102.1 |
| 1 | 10.0 | YES | 70/90 | 85 KBPS | 120 KBPS | 192.100.102.13 |
| 1 | 10.0 | YES | 70/90 | 90 KBPS | 115 KBPS | 192.100.102.26 |
| 2 | 9.0 | NO | 80 | 15 KBPS | 105 KBPS | 192.100.104.56 |
| 2 | 10.0 | YES | 80 | 80 KBPS | 120 KBPS | 192.100.104.34 |

ADAPTIVE CONNECTIVITY IN NETWORK-BASED COLLABORATION BACKGROUND INFORMATION

CROSS REFERENCE

This application, filed on Feb. 12, 2016 and entitled "Adaptive Connectivity in Network-Based Collaboration Background Information," is a Continuation of U.S. patent application Ser. No. 12/269,736, filed on Nov. 12, 2008 and entitled "Adaptive Connectivity in Network-Based Collaboration Background Information," having issued on Mar. 22, 2016 as U.S. Pat. No. 9,294,291, the entirety of which is incorporated by reference herein.

BRIEF SUMMARY

Use of network-hosted conferencing, such as over the Internet, has grown considerably in recent years. Many products on the market allow a presenter to share views and audio over a central server with many conference participants. Some of these products may also be used in a collaborative environment, such as between members of a development team. In such instances, control of a computer or computer application on one computer may be shared over a network with other users. Such products offer such functionally in a very similar manner through a server that requires a standalone client software application on each computer of each participant. Such client software is tightly coupled to a server that receives data from one client and distributes the data among other participating clients. The client software is typically created and distributed by the developer of the server software to prevent compatibility and security issues between the client and server software.

DETAILED DESCRIPTION

Various embodiments described herein include one or more of systems, methods, software, and data structures for peer-to-peer (P2P) transmitting of data. In some instances, certain types of collaboration session data, such as audio/video data that may originate with a camera and microphone, may be transmitted between collaboration session participants in a P2P manner while the remaining collaboration session data are transmitted through the collaboration server. A collaboration server may facilitate P2P sharing of data and may coordinate switching between a traditional, server-centric Hub-and-Spoke (HaS) mode and a P2P mode of sharing various streams of collaboration session data. These and other embodiments are described and illustrated herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer-executable instructions stored on computer-readable media such as memory or other types of storage devices. Further, described functions may correspond to modules, which may be software, hardware, firmware, or any combination thereof. Multiple functions are performed in one or more modules as desired, and the embodiments described are merely examples. The software is executed on a digital signal processor, application-specific integrated circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 1:
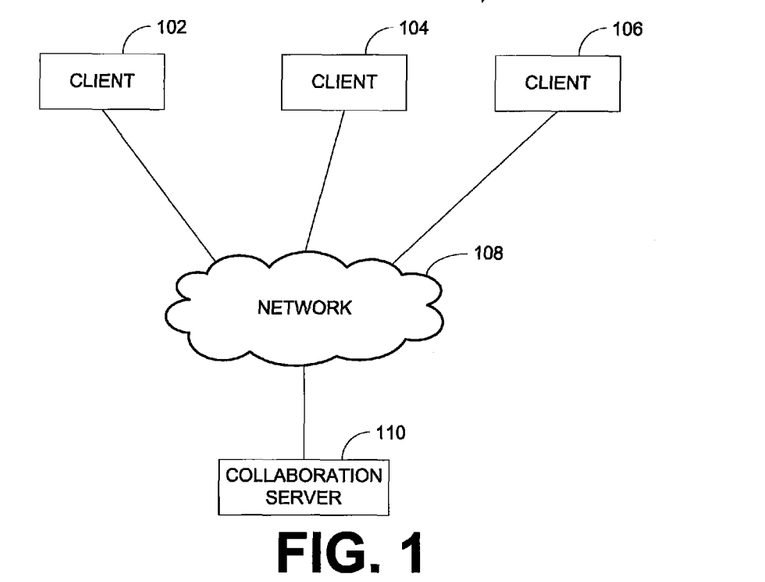
FIG. 1 is a logical block diagram of a system according to an example embodiment.

FIG. 1 is a logical block diagram of a system 100 according to an example embodiment. The system 100 typically includes a collaboration server 110 that may communicate with clients 102, 104, 106 over a network 108. The collaboration server 110 may offer one or more collaboration services to the clients 102, 104, 106 through web service calls that may be sent to and received from the collaboration services over the network 108.

In some embodiments, the collaboration services, when called or otherwise utilized, may consume, manipulate, create, or store data. This data may be stored on the collaboration server 110, on another server (not illustrated), in a database (not illustrated), or in another data storage location (not illustrated). In some embodiments, this data may include data identifying authorized users, user or organizational collaboration service subscription and usage information, configuration settings, and other data that may be consumed, manipulated, created, or stored during operation of one or more of the collaboration services.

The collaboration services on the collaboration server 110 may divide functionality of collaboration applications to allow other applications to leverage collaboration functionality. This provides the potential to develop any number of different kinds of client 102, 104, 106 applications that all rely on the same collaboration services. Accordingly, a developer may conveniently add new features to a client 102, 104, 106, leveraging a provided set of collaboration services. For example, one embodiment may expose streaming audio/video, data messaging, and presence, user identity, roles, and the like as services that may be leveraged by client applications.

The various embodiments described herein may provide different mechanisms whereby collaboration data may be communicated between clients 102, 104, 106 in a P2P manner, bypassing the collaboration server 110. In some such embodiments, the collaboration services of the collaboration server 110 may include a P2P facilitation and monitoring module that receives, or otherwise obtains or generates, data pertinent to facilitating P2P data sharing among clients 102, 104, 106. This data may include data regarding each client 102, 104, 106 participating in a collaboration session such as connectivity data, current data transmission and reception rates, software version data, network ports available to the respective clients 102, 104, 106, and other data depending on the particular embodiment. In some other embodiments, P2P facilitation may be performed by the clients 102, 104, 106. For example, a software element may be present on the clients 102, 104, 106 that gathers and shares local data pertinent to facilitating P2P data sharing and receives this data from the other clients 102, 104, 106. The data may initially be shared via the collaboration server 110, but upon making P2P connections, the clients 102, 104, 106 may share updates to this data via either the collaboration server 110 or the P2P connections.

In some embodiments, the collaboration server 110 may evaluate the data and determine if P2P sharing of one or more data streams of a collaboration session is possible and feasible according to determinable criterion, such as bandwidth requirements, a number of participants, and other criteria. In other embodiments, each client may make a local determination if P2P connections by the local client 102, 104, 106 are possible and feasible. P2P sharing may not be possible in some circumstances. For instance, if the data being considered for P2P sharing needs software of a particular type or version to communicate in a P2P manner and that software is not present on one of the clients 102, 104, 106 of the collaboration session, P2P sharing is not possible. Also, if the collaboration session is being recorded by the collaboration server 110, the collaboration session data typically flows to the collaboration server 110 in order to be recorded, and P2P sharing would defeat that. Other scenarios where P2P sharing is not possible may occur when P2P sharing requires communication over a network port not available to one or more clients 102, 104, 106, the network 108 is configured to prevent P2P communications, a lack of available bandwidth needed for a particular collaboration session, or a data stream thereof, to be conducted in a P2P manner, and other factors that may prevent one or more clients 102, 104, 106 from P2P communications. Thus, the P2P possibility and feasibility determinations may be made by one or more of the clients 102, 104, 106, the collaboration server 110, or by both clients 102, 104, 106 and the collaboration server 110.

The term feasible is used herein to describe factors that may make P2P communication undesirable, even if possible. For example, P2P communication between three clients 102, 104, 106 collaboration session participants may be feasible. However, P2P communication between four or more collaboration session participants may not be desirable, although possible, due to the large amount of network bandwidth that would be consumed by four-participant P2P communications. There may be many factors that may be considered, alone or in combination, to determine feasibility. These factors may be specified within one or more services of the collaboration server 110, on a client 102, 104, 106, or as configuration settings on either.

In one scenario, two or more clients 102, 104, 106 may connect over the network 108 to a collaboration session hosted by the collaboration server 110. Each client 102, 104, 106 participant will evaluate various properties of the connection to the collaboration session and report those properties to the collaboration server 110. The collaboration server 110 may then determine if one or more data streams of the collaboration session may be transitioned to P2P communication between the client 102, 104, 106 participants. If possible and feasible, the service of the collaboration server 110 may send a command instructing the client 102, 104, 106 participants to transition one or more data streams, such as an audio/video data stream, to P2P between the participants. The command may include connectivity information needed by each client 102, 104, 106 participant to connect to the other client 102, 104, 106 collaboration session participants over the network 108.

In another scenario, two or more clients 102, 104, 106 may connect over the network 108 to a collaboration session hosted by the collaboration server 110. The clients 102, 104, 106 may obtain P2P connectivity data needed to establish P2P connections with the other clients 102, 104, 106 from the collaboration server 110. Each client 102, 104, 106 participant will evaluate various properties of the connection to the collaboration session and properties of the collaboration session, such as one or more of the number of participants, bandwidth usage, types of data being shared, and other properties. Each client 102, 104, 106 determines if it is possible for the particular client 102, 104, 106 to conduct at least a portion of the collaboration session via P2P connections. Data representative of the client 102, 104, 106 determinations may then be shared via one or both of the collaboration server 110 and P2P connections that are established or previously existing. If a client 102, 104, 106 determines that P2P sharing is possible and feasible, the client 102, 104, 106 may then attempt to establish such connections. If all of the clients 102, 104, 106 successfully establish P2P connections with the other clients 102, 104, 106, some or all collaboration session data may then be shared via the P2P connections. Data not shared via the P2P connections may continue to be shared via the collaboration server 110.

Other streams of collaboration session data may continue to flow through the collaboration server 110, such as a shared desktop view and shared whiteboard data. The collaboration server 110 may continue to monitor the collaboration session that includes the P2P communication and reevaluate whether P2P communication should continue. If the P2P communication should not continue, such as if the communication becomes no longer possible or unfeasible, or if the collaboration session is later designated for recording, a service of the collaboration server 110 may send a command to each of the client 102, 104, 106 participants to resume all communications via the collaboration server 110.

Although the illustration of FIG. 1 includes three clients 102, 104, 106, other numbers of clients may be connected to the network and to a particular collaboration session. For example, a collaboration session may be between two or more client 102, 104, 106 participants. Further, some embodiments may include a cloud of servers dedicated to provisioning of collaboration services, which may host collaboration rooms or sessions of virtually any client.

Further, any number of variations and types of client applications may be specifically built and embedded within other applications, such as a graphics editing application, a page description language view application, a word processing application, and other typical standalone application types. Some embodiments may also include leveraging of collaboration services by websites allowing collaboration between team members, communication between a customer and merchant, buyer and seller, teacher and student, friends and family, and others through off-the-shelf applications, custom applications, websites, and the like.

Figure 2:
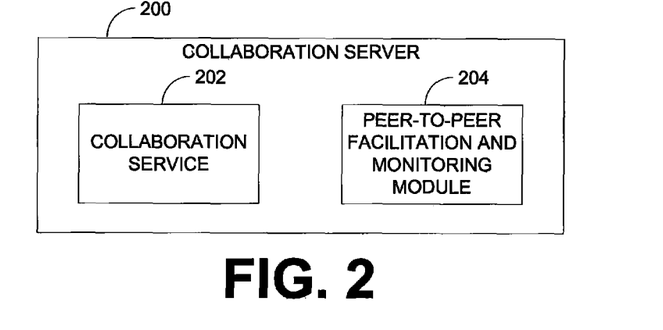
FIG. 2 is a logical block diagram of a collaboration server according to an example embodiment.

FIG. 2 is a logical block diagram of a collaboration server 200 according to an example embodiment. The collaboration server 200 is an example of a collaboration server 110 as described above with regard to FIG. 1. The collaboration server 200 includes one or more collaboration services 202 and a P2P facilitation and monitoring module 204.

The one or more collaboration services 202, such as web services, may be utilized by client collaboration applications. The one or more collaboration services 202 may be provided by service modules that typically receive data from a first client collaboration application through a web service call and broadcast the received data to other client collaboration applications participating in a collaboration session, such as by joining a collaboration "room."

The collaboration server 200 typically provides several collaboration services 202. These one or more collaboration services 202 may be objects, programs, application programming interfaces, or other units of software. In some embodiments, each service is embodied in a single module. In other embodiments, multiple services are embodied in a single module. Combinations of services within modules may be made based on a class of functionality, such as by the type of data communicated through the module, the type of communication, such as inbound or outbound, or in virtually any other manner. However, in other embodiments, a single service module may include a single service that is entirely data and application agnostic. Thus, the services described below may be provided in a single module, a few modules, or many modules. The name given to the particular service in the following description is given merely to describe the type of functionality the particular service is provided for and is not intended to limit modules within which services may be included.

The services may include client-side modules to implement functionality, such as: a P2P module, roster, chat, polling, notes, screen sharing, web cam or other streaming video, shared white board, file transfer, audio and visual, general data transfer, gesture tool (such as a pointing device or cursor), user interface controls, administration, and others depending on the embodiment. In some embodiments, the services may be called by client applications to implement the functionality of the client service modules on the client. In such embodiments, the client service modules include client-side logic to handle data that may be communicated via the one or more collaboration services 202.

A roster service, in some embodiments, includes one or more services to identify collaboration session participants and present participant information in a roster type control on one or more client collaboration applications connected to a collaboration session. The roster services may identify and implement roles of one or more collaboration session participants, such as organizer, presenter, administer, participant, and the like.

Administration services may be used to create or schedule a collaboration session, authorize participants of a collaboration session, modify or create participant roles and permissions, declare a collaboration session as closed to a finite number of participants, certain participants, or publicly available.

Chat services typically enable text-based chat between collaboration session participants. In some embodiments, the chat services may allow a participant to send a chat message to less than all of the other participants if desired. In some embodiments, based on a permissions of a certain role as declared via the administration service, messages of a particular participant may be blocked from transmission to other participants, such as in the event the blocked participant is abusing the chat functionality. Chat messages may also be sent to an administrator for approval prior to communication to other collaboration session participants.

A polling service typically allows one participant to set up a poll for other participants to answer. A note service typically allows transmission of a note to one or more other participants. This may include a text block placed as a control on a certain portion of a shared screen view. A screen share service typically allows a screen view of one client application to be shared with other participants. The screen share services may also allow sharing control of the screen, such as allowing one or more other participants to provide input via a keyboard and pointing device.

A web cam service may allow sharing of streaming video between collaboration session participants. In some embodiments, use of the web cam service may be configured through services of one or more of the administration and web cam services to limit the number of shared video streams or allow only a presenter's video stream to be displayed. A shared video stream may also include audio.

A white board service typically provides functionality to clients to receive and share whiteboard-type input. Whiteboard-type input typically includes drawings made within a virtual whiteboard. As with the streaming video services described above, use of the whiteboard services may be limited to only a presenter and/or other roles.

A file transfer service typically allows one collaboration session participant to upload a file and transfer the file to all, or a select number of, other participants. An audio/visual service provides for exchanging audio, video, and combined audio and video, such as in streams, between collaboration session participants.

However, as mentioned above, some embodiments include a data agnostic collaboration service that may be called to share collaboration data of virtually any type so long as the service call is properly made. The service call may be properly made, in some embodiments, simply by identifying the proper collaboration session and a sender of the service call. The payload data of the data agnostic collaboration service call is not of concern and is simply relayed to the other collaboration session participants.

The P2P facilitation and monitoring module 204 monitors collaboration session performance and polls client participants for data to determine if P2P sharing of collaboration session data is possible and feasible. The P2P facilitation and monitoring module 204 is also able to generate and transmit commands to collaboration session participants to initiate and terminate T2P share of collaboration session data.

Figure 3:
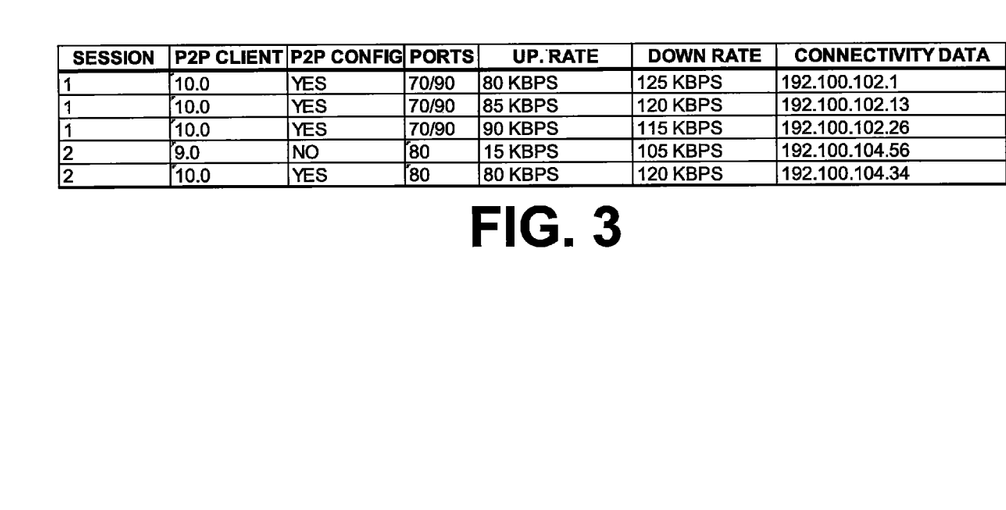
FIG. 3 is a collaboration session tracking table according to an example embodiment.

For example, the P2P facilitation and monitoring module 204 may maintain, or have access to, data identifying collaboration session participants and data needed by the various participant clients to connect to the other participant clients. The P2P facilitation and monitoring module 204 may further aggregate data into a table, such as is illustrated in FIG. 3, along with data received from client collaboration session participants. The data in the table of FIG. 3 includes a row of data for each collaboration session participant. The data in each row includes a collaboration session identifier and a version number of a P2P client application or application plug-in. The data in each row further includes data received from a client collaboration session participant, such as from an application or application plug-in enabled to communicate with the collaboration server 200 over a network. The data in each row may include a version number of a P2P client, an indicator if the client is configured for P2P communications, and data indicating ports that are either available for or restricted from use in P2P communication. The data in each row may further include data indicative of a data upload rate and a data download rate as determined by the client, the server, or a combination thereof. Each row of data may also include connectivity data such as an IP address or other data as needed to establish a P2P connection with a respective client. The data included in the table of FIG. 3 is just one example and the data may vary depending on the particular details of an embodiment.

In one embodiment, the P2P facilitation and monitoring module 204, upon receipt of data from each collaboration session participant client, may evaluate the data and determine that P2P sharing of an audio/video stream of collaboration data may be exchanged in a P2P manner. The P2P facilitation and monitoring module 204 will send a message to each client indicating that such data stream will now be communicated via P2P connections. The message will also include connectivity data for each of the other participants. Upon establishing the P2P connections, the participant clients will send all further data of the audio/video stream via the P2P connections. The switching from server-centric sharing of the audio/video collaboration data to P2P sharing is performed without human user intervention.

In some embodiments, the P2P facilitation and monitoring module 204 may also, or alternatively, be included within client participant software. In such embodiments, the client participant P2P facilitation and monitoring modules may perform the same functionality, but based on client-specific factors. The client participant P2P facilitation and monitoring modules may also include a table of aggregated P2P connectivity data, such as the table of FIG. 3. The data of this table may be received from one or both clients over P2P connections or from the collaboration server 200 and populated into the table. The data in this table may be included in client determinations as to possibility and feasibility of P2P connectivity.

Figure 4:
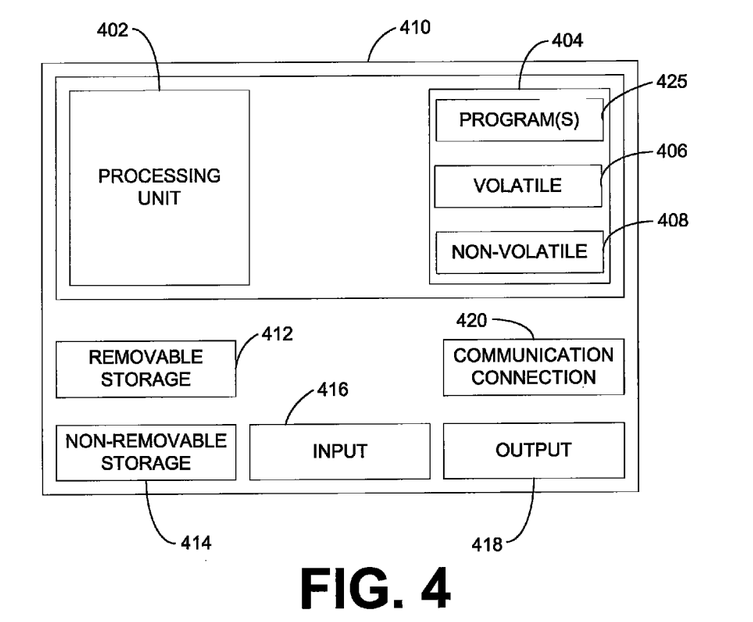
FIG. 4 is a block diagram of a computing device according to an example embodiment.

FIG. 4 is a block diagram of a computing device according to an example embodiment. In one embodiment, multiple such computer systems are utilized in a distributed network to implement multiple components in a transaction-based environment. For example, the computing device of FIG. 4 is an example computing device that may be used as a computing platform for either of the clients 102, 104, 106 or the collaboration server 110 of FIG. 1. Returning to FIG. 4, an object-oriented, service-oriented, or other architecture may be used to implement such functions and communicate between the multiple systems and components. One example computing device in the form of a computer 410 may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer 410 may operate in a networked environment using a communication connection to connect to one or more remote computers, such as database servers. The remote computer may include a personal computer (PC), handheld computing device, set-top box, server, router, network PC, a peer device or other common network node, or the like. The communication connection may include one or more of the Internet, a Local Area Network (LAN), a Wide Area Network (WAN), and other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of providing the various collaboration services of a collaboration server as described above may be encoded on a computer readable medium. A further example of a computer program is a web browser and a web browser plug-in, such as a FLASH® PLAYER plug-in available from ADOBE SYSTEMS INCORPORATED of San Jose, Calif. that is enabled with P2P functionality (e.g. FLASH® PLAYER version 10.0). The computer program 425, such as the plug-in, may include an application programming interface (API) that provides an interface to P2P connectivity and communication services for implementing one or more of the embodiments described herein.

Figure 5:
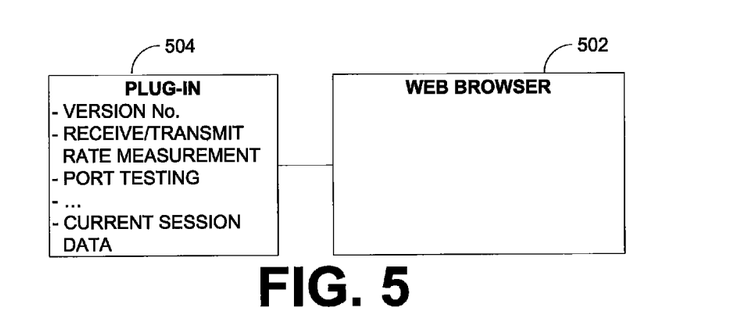
FIG. 5 is a logical block diagram of a portion of a client computing device according to an example embodiment.

FIG. 5 is a logical block diagram of a portion of a client computing device according to an example embodiment. The illustrated portion of the client computing device includes a web browser 502 and an application plug-in 504. The web browser 502 may be virtually any web browser, such as an INTERNET EXPLORER® web browser available from MICROSOFT CORPORATION of Redmond, Wash. The application plug-in 504 may be the FLASH® PLAYER plug-in as mentioned above. The web browser 502, in some embodiments, may be directed to a particular URL at which collaboration session participants are to visit to connect to a collaboration session. The web browser 502 downloads a script from the website at the URL. The script includes instructions to instantiate the application plug-in 504 and to direct the application plug-in 504 to connect to a collaboration server. The application plug-in 504, upon connection to the collaboration server, will receive collaboration session data, such as further scripts to generate a collaboration session view within the web browser 502 or elsewhere within a display of the client computing device. The application plug-in 504 will also receive collaboration data from other participants. The application plug-in 504 may also receive a request from the collaboration server for data pertinent to facilitating P2P data sharing between participants. The application plug-in 504 will collect that data, such as an application plug-in 504 version number, data receive and transmit rates, ports available for P2P connections, and other data as need or requested. The application plug-in 504 may include functionality to measure data download and transmission rates and to identify the available port. However, such functionality may also, or alternatively, be implemented through scripts received from a collaboration server and executed by the application plug-in 504.

Figure 6:
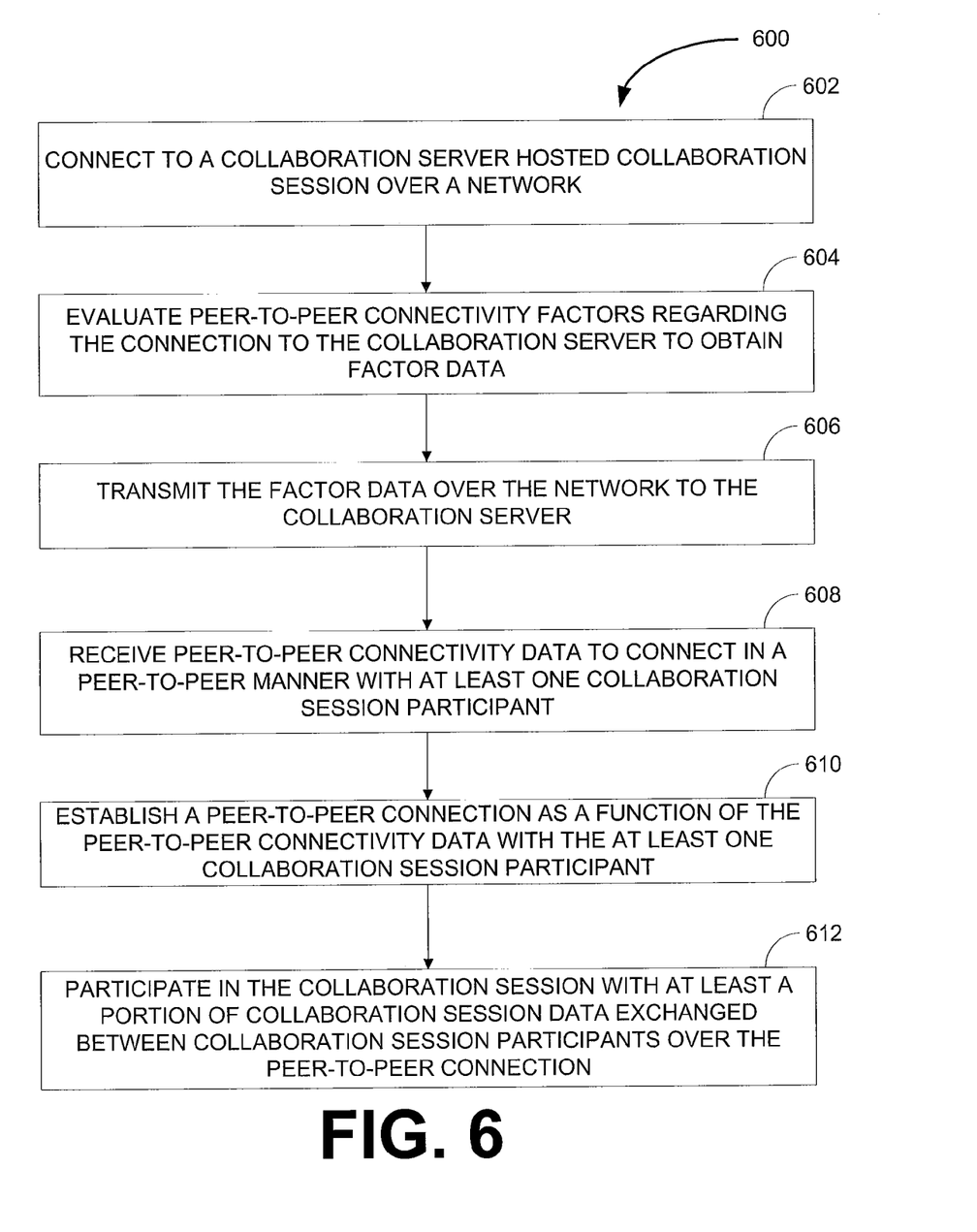
FIG. 6 is a block flow diagram of a method according to an example embodiment.

FIG. 6 is a block flow diagram of a method 600 according to an example embodiment. The method 600 is an example of a method that may be performed by a collaboration session client. The method 600 includes connecting 602 to a collaboration server hosted collaboration session over a network and evaluating 604 P2P connectivity factors regarding the connection to the collaboration server to generate factor data. The method 600 further includes transmitting 606 the factor data over the network to the collaboration server and receiving 608 P2P connectivity data to connect in a P2P manner with at least one collaboration session participant. Upon receiving 608 the P2P connectivity data, the method 600 includes establishing 610 a P2P connection as a function of the P2P connectivity data with the at least one collaboration session participant and participating 612 in the collaboration session with at least a portion of collaboration session data exchanged between collaboration session participants over the P2P connection. In some embodiments, the factor data may also, or alternatively, be transmitted 606 over the network to each connected client.

In some embodiments, the evaluated 604 P2P Connectivity factors include at least one of a download network connection rate, an upload connection rate, a version of a software application plug-in, and availability of network communication ports for sending and receiving data over the network. The evaluating 604 of P2P connectivity factors to obtain the factor data and transmitting the factor data over the network to the collaboration server may be performed at periodic intervals while connected to the collaboration server hosted collaboration session. Receiving 608 further P2P connectivity data may include receiving data instructing a switch from exchanging the portion of collaboration session data designated for exchange via the P2P connection to exchanging all data via the collaboration server.

Connecting 602 to the collaboration server hosted collaboration session may include downloading an instruction set executable on a local computing device. The instruction set in such embodiments may include instructions to perform the transmitting 606, receiving 608, establishing 610, and participating 612. Participating 612 in the collaboration session may include displaying a representation of received collaboration data intended for display. Participating 612 may also include capturing input received on a computing device performing the method and transmitting the captured input to collaboration session participants via one of the collaboration server or one or more P2P connections.

Figure 7:
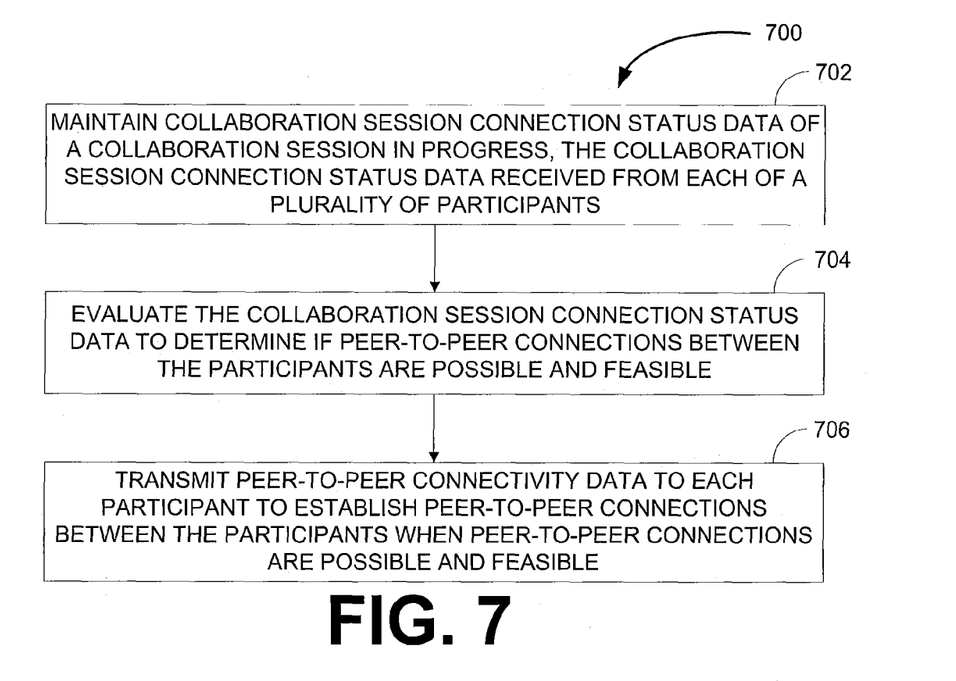
FIG. 7 is a block flow diagram of a method according to an example.

FIG. 7 is a block flow diagram of a method 700 according to an example embodiment. The method 700 is an example of a method that may be performed by a collaboration server. The method 700 includes maintaining 702 collaboration session connection status data of a collaboration session in progress. The collaboration session connection status data is received from each of a plurality of participants in the collaboration session. The method 700 further includes evaluating 704 the collaboration session connection status data to determine if P2P connections between the participants are possible and feasible and transmitting 706 P2P connectivity data to each participant to establish P2P connections between the participants when P2P connections are possible and feasible. The transmitted 706 P2P connectivity data may instruct each participant to exchange collaboration data of at least one data type via the P2P connections, such as audio/video data. When P2P exchanging of collaboration data within a collaboration session is active, other collaboration data of the same collaboration session may still be exchanged via a collaboration server performing the method 700. For example, audio/video collaboration data may be shared via the P2P connections while screen sharing collaboration data may be exchanged via the collaboration server.

In some embodiments, evaluating 704 the collaboration session connection status data to determine if P2P connections between the participants are possible and feasible includes evaluating, alone or in combination, collaboration session connection status data received from each participant. The collaboration session connection status data may include status data representative of a number of P2P connections each participant has established, upload and download rates of each participant, available network communication ports of each participant, and a version of a software element used by each participant to participate in the collaboration session.

The method 700 may further include receiving a command from a participant to record the collaboration session. In such instances, all collaboration data may flow through a collaboration server, such as a collaboration server performing the method 700. The method 700 may then transmit a P2P connection termination message to each participant directing the participants to terminate the P2P connections and to exchange all collaboration data via a collaboration server performing the computer implemented method 700. The collaboration session may then be recorded.

Figure 8:
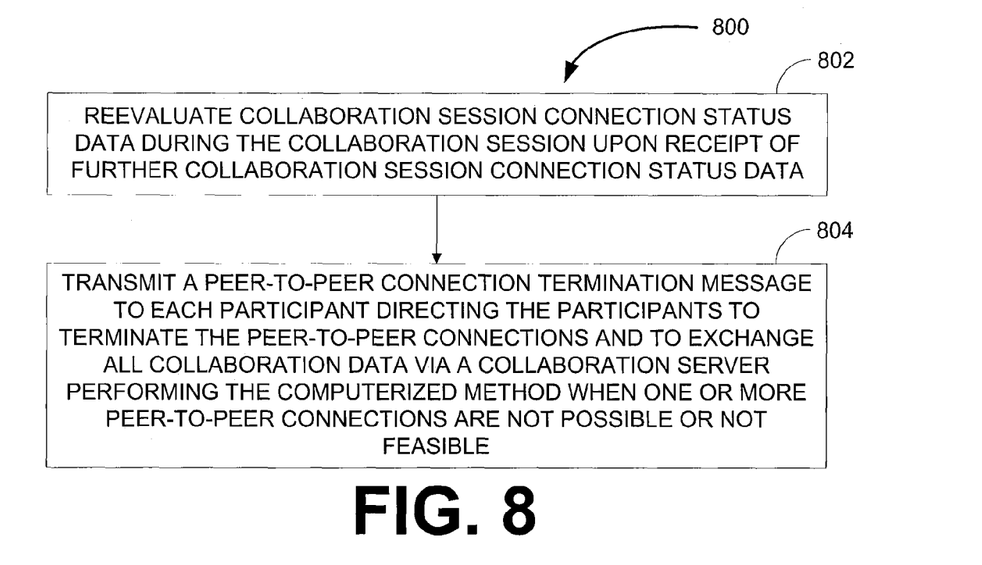
FIG. 8 is a block flow diagram of a method according to an example.

FIG. 8 is a block flow diagram of a method 800 according to an example embodiment. The method 800 is an example of a method that may be performed by a collaboration server. The method 800 includes reevaluating 802 collaboration session connection status data during the collaboration session upon receipt of further collaboration session connection status data. The method 800 may further include transmitting 804 a P2P connection termination message to each participant directing the participants to terminate the P2P connections and to exchange all collaboration data via a collaboration server performing the computer implemented method 800 when one or more P2P connections are not possible or not feasible.

Figure 9:
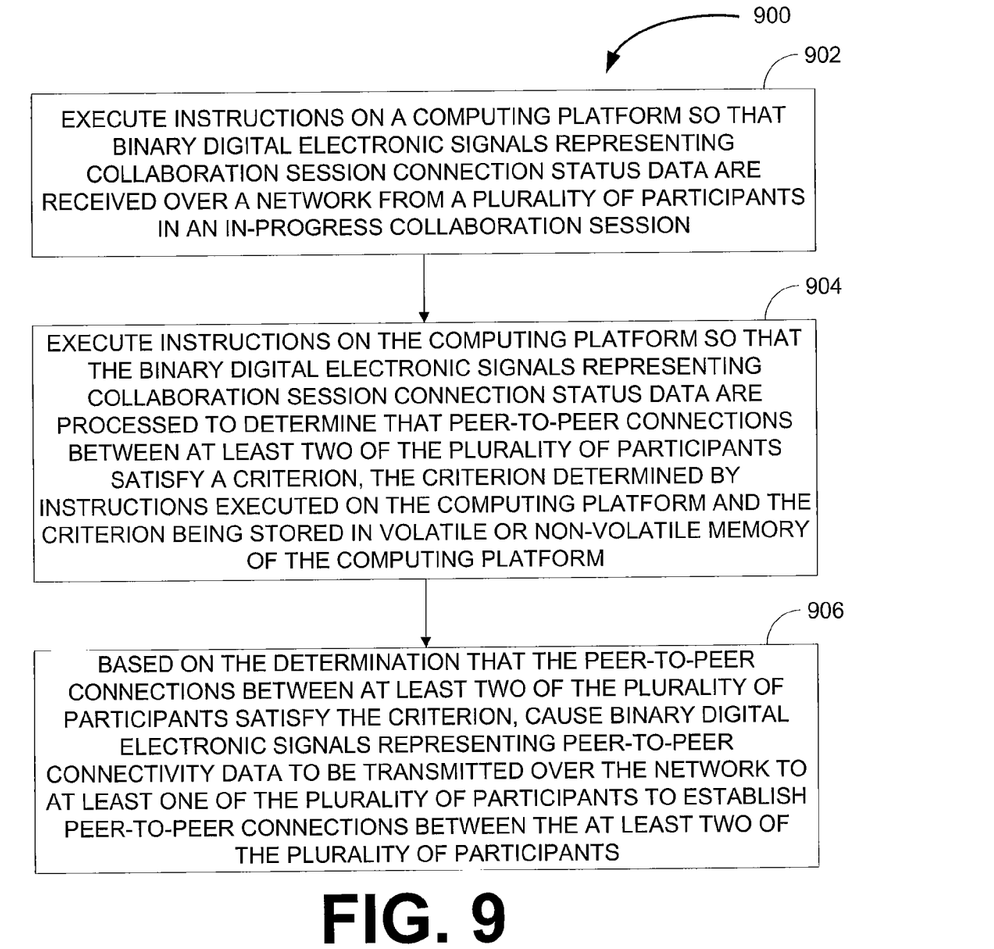
FIG. 9 is a block flow diagram of a method according to an example.

FIG. 9 is a block flow diagram of a method 900 according to an example embodiment. The method 900 is an example of a method that may be performed on a computing platform, such as a device as illustrated in FIG. 4, as part of a collaboration session. The method 900 includes executing 902 instructions on a computing platform so that binary digital electronic signals representing collaboration session connection status data are received over a network from a plurality of participants in an in-progress collaboration session. The method 900 further includes executing 904 instructions on the computing platform so that the binary digital electronic signals representing collaboration session connection status data are processed to determine that peer-to-peer connections between at least two of the plurality of participants satisfy a criterion. The criterion is typically determined by instructions executed on the computing platform and the criterion may be stored in volatile or nonvolatile memory of the computing platform. The method 900 may further include, based on the determination that the peer-to-peer connections between at least two of the plurality of participants satisfy the criterion, causing 906 binary digital electronic signals representing peer-to-peer connectivity data to be transmitted over the network to at least one of the plurality of participants to establish peer-to-peer connections between the at least two of the plurality of participants.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

Also in the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

What is claimed is:

1. A computer implemented method comprising:
connecting to a collaboration session, hosted by a collaboration server, over a network; evaluating peer-to-peer connectivity factors regarding a connection to the collaboration server; generating factor data using the peer-to-peer connectivity factors; upon a determination that a peer-to-peer connection with at least one collaboration session participant is to be established based on the factor data, establishing a peer-to-peer connection with the at least one collaboration session participant; and participating in the collaboration session with at least a portion of collaboration session data to be exchanged with the at least one collaboration session participant over the peer-to-peer connection while at least one other portion of collaboration session data is exchanged concurrently via the collaboration server.

2. The computer implemented method of claim 1, wherein the peer-to-peer connectivity factors include at least one of:
a download network connection rate;
an upload connection rate;
a version of a software application plug-in; and
availability of network communication ports for sending and receiving data over the network.

3. The computer implemented method of claim 1, wherein evaluating peer-to-peer connectivity factors regarding the connection to the collaboration server is performed at periodic intervals while connected to the collaboration session.

4. The computer implemented method of claim 1, further comprising: subsequent to participating in the collaboration session with at least a portion of collaboration session data to be exchanged with the at least one collaboration session participant over the peer-to-peer connection, receiving instructions to exchange all collaboration session data via the collaboration server.

5. The computer implemented method of claim 1, wherein connecting to the collaboration session includes downloading an instruction set executable on a local computing device, the instruction set including instructions to perform the at least one of determining, establishing, and participating.

6. The computer implemented method of claim 1, wherein participating in the collaboration session includes:
displaying a representation of received collaboration data; capturing input received on a local computing device performing the method; and transmitting the captured input to the at least one collaboration session participant via one of the collaboration server or the peer-to-peer connection.

7. The computer implemented method of claim 1, wherein the portion of collaboration session data exchanged with the at least one collaboration session participant over the peer-to-peer connection includes one or more of audio data and video data.

8. A computer implemented method comprising:
receiving collaboration session connection status data regarding each of a plurality of participants in a collaboration session; evaluating the collaboration session connection status data to determine that peer-to-peer connections between the plurality of participants satisfy a determinable criterion; transmitting, over the network to the plurality of participants satisfying the determinable criterion, instructions to establish a peer-to-peer connection; and sharing collaboration data received from at least one of the plurality of participants by transmitting the collaboration data from a collaboration server to other participants, wherein the collaboration data is shared while other collaboration data is exchanged concurrently via peer-to-peer connections between the participants satisfying the determinable criterion.

9. The computer implemented method of claim 8, further comprising: upon receipt of additional collaboration session connection status data, evaluating the additional collaboration session connection status data; and determining that one or more peer-to-peer connections do not satisfy the determinable criterion; and transmitting a peer-to-peer connection termination message to each participant directing the participants to terminate the peer-to-peer connections and to exchange all collaboration data via the collaboration server performing the computer implemented method.

10. The computer implemented method of claim 8, wherein the transmitted instructions direct each participant to exchange collaboration data of at least one data type via the peer-to-peer connections.

11. The computer implemented method of claim 8, wherein evaluating the collaboration session connection status data to determine that peer-to-peer connections between the plurality of participants satisfy the determinable criterion includes evaluating, alone or in combination, collaboration session connection status data representative of at least one of:
a number of peer-to-peer connections;
upload rates of each participant;
download rates of each participant;
available network communication ports of each participant; and
a version of a software element used by each participant to participate in the collaboration session.

12. The computer implemented method of claim 8, further comprising: determining that one or more data streams of the collaboration session may be transitioned to one or more peer-to-peer connections between the plurality of participants.

13. The computer implemented method of claim 8, further comprising: receiving a command from a participant to record the collaboration session; transmitting a peer-to-peer connection termination message to each participant directing the participants to terminate the peer-to-peer connections and to exchange all collaboration data via the collaboration server performing the computer implemented method; and recording the collaboration session.

14. A collaboration server comprising:
a bus;
a network interface coupled to the bus;
a processor coupled to the bus;
a memory device coupled to the bus and holding an instruction set executable on the processor to cause the system to:
maintain, in the memory device, collaboration session connection status data of a collaboration session in progress, the collaboration session connection status data received over the network interface from each of a plurality of participants; evaluate the collaboration session connection status data; determine that peer-to-peer connections between the participants satisfy a determinable criterion based on the evaluation of the collaboration session connection status data; transmit, over the network interface, peer-to-peer connectivity data to each participant based on the determination that peer-to-peer connections satisfy the determinable criterion, wherein the peer-to-peer connectivity data includes instructions to the participants to exchange a first data type via the peer-to-peer connections between the participants; and when collaboration data is received from a participant, transmit the received collaboration data from the collaboration server to other participants while collaboration data of the first data type is exchanged concurrently via the peer-to-peer connections between the participants.

15. The collaboration server of claim 14, wherein the instruction set is further executable on the processor to cause the system to:
reevaluate collaboration session connection status data during the collaboration session upon receipt of additional collaboration session connection status data; and transmit a peer-to-peer connection termination message to each participant directing the participants to terminate the peer-to-peer connections and to exchange all collaboration data including the first data type via the system based on a determination that one or more peer-to-peer connections do not satisfy the determinable criterion.

16. The collaboration server of claim 14, wherein the instruction set is further executable on the processor to cause the system to receive the collaboration session connection status data from each of the participants.

17. The collaboration server of claim 16, wherein the at least a first data type to be exchanged via the peer-to-peer connections includes audio/video data.

18. The collaboration server of claim 14, wherein evaluating the collaboration session connection status data includes evaluating, alone or in combination, collaboration session connection status data representative of:
a number of peer-to-peer connections;
upload and download rates of each participant;
available network communication ports of each participant; and
a version of a software element used by each participant to participate in the collaboration session.

19. The collaboration server of claim 14, wherein the instruction set is further executable on the processor to cause the system to:
receive a command from a participant to record the collaboration session;

transmit a peer-to-peer connection termination message to each participant directing the participants to terminate the peer-to-peer connections and to exchange all collaboration data via the system; and record the collaboration session.

20. The collaboration server of claim 14, wherein the instruction set executable on the processor to cause the system to monitor the collaboration session including the established peer-to-peer connections between the participants.

* * * * *